United States Patent

Day et al.

[11] Patent Number: 6,089,014
[45] Date of Patent: Jul. 18, 2000

[54] ENGINE EXHAUST SYSTEM WITH REDUCED HYDROCARBON EMISSIONS

[75] Inventors: John P. Day, Big Flats; Rodney I. Frost, Corning; Louis S. Socha, Jr., Painted Post; Irwin M. Lachman; Mallanagouda D. Patil, both of Corning, all of N.Y.

[73] Assignee: Corning Incorporated, Corning, N.Y.

[21] Appl. No.: 07/535,323

[22] Filed: Jun. 8, 1990

[51] Int. Cl.[7] .............................. C01B 21/20; F01N 3/00; F01N 3/02

[52] U.S. Cl. .................... 60/274; 60/297; 60/311; 422/171; 423/212; 423/213.2; 423/213.5; 423/213.7

[58] Field of Search .................... 60/274, 297, 311; 422/171; 423/212, 213.5, 213.2, 213.7

[56] References Cited

U.S. PATENT DOCUMENTS

| | | |
|---|---|---|
| 3,476,508 | 11/1969 | Kearby et al. . |
| 3,674,441 | 7/1972 | Cole .......................................... 60/297 |
| 3,699,683 | 10/1972 | Tourtellotte ................................ 60/297 |
| 3,702,886 | 11/1972 | Argauer et al. ........................... 423/328 |
| 3,709,979 | 1/1973 | Chu ........................................... 423/328 |
| 3,730,910 | 5/1973 | Albers et al. ........................ 252/455 Z |
| 3,832,449 | 8/1974 | Rosinski et al. ......................... 423/328 |
| 3,896,616 | 7/1975 | Keith et al. ................................. 60/274 |
| 3,940,301 | 2/1976 | Straw et al. .............................. 156/155 |
| 3,963,827 | 6/1976 | Acres et al. .............................. 423/239 |
| 4,041,591 | 8/1977 | Noll et al. . |
| 4,041,592 | 8/1977 | Kelm . |
| 4,061,724 | 12/1977 | Grose et al. .............................. 423/335 |
| 4,089,088 | 5/1978 | Konczalski . |
| 4,257,885 | 3/1981 | Grose et al. .............................. 210/691 |
| 4,297,328 | 10/1981 | Ritscher et al. ....................... 423/213.2 |
| 4,306,611 | 12/1981 | Wardale ....................................... 165/7 |
| 4,381,255 | 4/1983 | Nozemack et al. ................. 252/455 Z |
| 4,631,267 | 12/1986 | Lachman et al. ........................ 502/439 |
| 4,637,995 | 1/1987 | DeAngelis et al. ...................... 502/439 |
| 4,657,880 | 4/1987 | Lachman et al. .......................... 502/64 |
| 4,683,214 | 7/1987 | Angevine et al. ......................... 502/66 |
| 4,800,187 | 1/1989 | Lachman et al. .......................... 502/64 |
| 4,985,210 | 1/1991 | Minami .................................... 422/169 |
| 5,051,244 | 9/1991 | Dunne ...................................... 423/212 |

FOREIGN PATENT DOCUMENTS

| | | |
|---|---|---|
| 1205980 | 6/1986 | Canada ...................................... 60/297 |
| 0 002 791 | 7/1979 | European Pat. Off. . |
| 0 003 818 | 9/1979 | European Pat. Off. . |
| 2214772 | 9/1973 | Germany .................................. 60/297 |
| 2189309 | 8/1987 | Japan ........................................ 60/297 |
| 68713 | 3/1988 | Japan ........................................ 60/297 |
| 257710 | 10/1989 | Japan ........................................ 60/297 |
| 2-126937 | of 1990 | Japan . |
| 2-135126 | of 1990 | Japan . |
| 2-75327 | of 1990 | Japan . |
| 1334243 | 10/1973 | United Kingdom . |
| 1 405 406 | 9/1975 | United Kingdom . |
| 2 017 520A | 10/1979 | United Kingdom . |

Primary Examiner—Wayne Langel
Attorney, Agent, or Firm—Richard N. Wardell; Maurice M. Klee; K. van der Sterre

[57] ABSTRACT

An engine exhaust system is disclosed which in operation is capable of substantially reducing the quantities of hydrocarbons emitted to the atmosphere during engine start-up. The system utilizes molecular sieve means, such as a high-silica zeolite, which function to adsorb hydrocarbons emitted during engine start-up, before the catalytic converter has attained its effective operating temperature. The system is designed so that, once the catalytic converter has attained an effective operating temperature, the hydrocarbons can be desorbed from the molecular sieve means and conveyed to the converter for conversion to non-toxic by-products.

24 Claims, 4 Drawing Sheets

ENGINE EXHAUST SYSTEM WITH REDUCED HYDROCARBON EMISSIONS

BACKGROUND OF THE INVENTION

This invention relates to an engine exhaust system designed so as to reduce hydrocarbon emissions therefrom. More specifically, this invention is concerned with overcoming pollution problems associated with engine start-up when polluting gases are found in the engine exhaust stream in great amounts.

The exhaust gases emitted by internal combustion systems utilizing hydrocarbon fuels, such as hydrocarbon gases, gasoline or diesel fuel, can cause serious pollution of the atmosphere. Among the pollutants in these exhaust gases are hydrocarbons and oxygen-containing compounds, the latter including nitrogen oxides ($NO_x$) and carbon monoxide (CO). The automotive industry has for many years attempted to reduce the quantities of gaseous emissions from automobile engine systems, the first automobiles equipped with catalytic converters having been introduced in model year 1975. The catalytic converters generally utilize noble metal catalysts capable of converting hydrocarbons, CO, and $NO_x$ to the non-toxic byproducts water, carbon dioxide and reduced nitrogen species.

The catalysts utilized in catalytic converter systems are generally ineffective at ambient temperature and must reach high temperatures, often in the range of 300 to 400° C., before they are activated. Typically, the temperature of the catalyst is elevated by contacting it with the high temperature exhaust gases from the engine. Continuous contact with those gases and the exothermic nature of the oxidation reactions occurring at the catalyst combine to maintain the catalyst at an elevated temperature. The temperature at which a catalytic converter can convert 50% of carbon monoxide, hydrocarbons or $NO_x$ is referred to as the "light-off" temperature of the converter.

During start-up of current commercial engines, the amounts of carbon monoxide and hydrocarbons in the exhaust gas are higher than during normal engine operation. For example, as noted in U.S. Pat. No. 3,896,616, the amount of carbon monoxide at start-up may be on the order of about 3 to 10 or more percent by volume percent (versus about 0.5 to 3% CO during normal operation), and the amount of hydrocarbons can typically be about 750 to 2,000 parts per million (ppm) (versus about 100 to 750 ppm during normal operation). Experiments by applicants have detected hydrocarbon emissions that are significantly higher even than these reported figures, particularly the emission levels generated during startup. Thus, a large portion of the total emission generated by an internal combustion engine is generated in the first few minutes of operation. Unfortunately, at start-up, when the catalytic converter is most needed, it may be relatively ineffective because it will not have reached a temperature at which it is activated.

There have been numerous suggestions for avoiding the pollution problems inherent in engine start-up, as noted by U.S. Pat. No. 3,896,616. For example, it has been suggested to electrically heat the catalytic converter before starting the engine, but this would unduly increase costs and also cause unacceptable delays before the engine could be started with the assurance that undesirable pollution of the atmosphere would not occur. It has also been recommended that the catalytic converters be placed as close to the engine as physically possible to minimize the emission of pollutants during the initial engine start-up. The closer the catalyst is to the engine, the hotter will be the exhaust gas when it contacts the catalyst and the more quickly the temperature of the catalyst will be raised to operating level. However, due to limitations of space in most vehicles, locating the total amount of catalyst in the system near the engine is difficult.

U.S. Pat. No. 3,896,616 suggests that excellent purification of engine exhaust gas is obtained by utilizing an initial catalyst, preferably in a converter vessel placed near the engine, for instance, closely adjacent the exhaust manifold, and a subsequently inline catalyst. The initial catalyst, being close to the engine, will supposedly reach its effective operating temperature significantly sooner than the in-line catalyst. On cold engine start-up, however, during the time before the initial catalyst reaches its effective temperature, substantial quantities of pollutants would still be introduced to the atmosphere. In addition, because the initial catalyst is positioned close to the engine, it can be overheated, causing degradation and loss of effectiveness.

As the public's attention to the problem of air pollution grows, government emission standards are being made increasingly more restrictive. There remains a need for an engine exhaust system which in operation can reduce the amounts of pollutants introduced into the atmosphere during the critical engine start-up period.

SUMMARY OF THE INVENTION

An engine exhaust system which in operation is capable of substantially reducing the quantities of hydrocarbons emitted to the atmosphere during the critical engine start-up period has now been developed. This invention relates to an engine exhaust system for substantially converting hydrocarbons in a hydrocarbon-containing engine exhaust stream to water and carbon dioxide comprising molecular sieve means for adsorbing hydrocarbons from said engine exhaust stream, said means being capable of adsorbing hydrocarbons from said engine exhaust stream and further capable of having hydrocarbons desorbed therefrom upon heating to a desorption temperature;

main catalytic converter means for substantially converting hydrocarbons in said stream to water and carbon dioxide, said main catalytic converter means having a light-off temperature;

one or more directing means for selectively directing said engine exhaust stream within said engine exhaust system, whereby said directing means operate to
  (i) direct, for a first period of time prior to said molecular sieve means attaining its desorption temperature, substantially all of said exhaust stream through said molecular sieve means and said converter means;
  (ii) direct, for a second period of time thereafter, substantially all of said exhaust stream through said main catalytic converter means, bypassing said molecular sieve means; and
  (iii) direct, for a third period of time thereafter, after said catalytic converter means attains at least its light-off temperature, at least a portion of said exhaust stream through said molecular sieve means and thereafter through said main catalytic converter means, said directed portion of exhaust stream being sufficient to raise the temperature of said molecular sieve means to its desorption temperature and thereby effect desorption of hydrocarbons therefrom.

In addition to the above-described engine exhaust system, this invention relates to a method of controlling hydrocarbon emissions from an internal combustion engine producing a hydrocarbon-containing exhaust stream comprising providing main catalytic converter means for substantially converting hydrocarbons in said hydrocarbon-containing exhaust stream to water and carbon dioxide, said main catalytic converter means having a light-off temperature;

providing molecular sieve means for adsorbing hydrocarbons from said exhaust stream, said means being capable of adsorbing hydrocarbons from said exhaust stream and further capable of having hydrocarbons desorbed therefrom upon heating to a desorption temperature;

selectively directing said exhaust stream so as to
(i) direct, for a first period of time prior to said molecular sieve means attaining its desorption temperature, substantially all of said exhaust stream through said molecular sieve means and said converter means;
(ii) direct, for a second period of time thereafter, substantially all of said exhaust stream through said main catalytic converter means, bypassing said molecular sieve means; and
(iii) direct, for a third period of time thereafter, after said catalytic converter means attains at least its light-off temperature, at least a portion of said exhaust stream through said molecular sieve means and thereafter through said main catalytic converter means, said directed portion of exhaust stream being sufficient to raise the temperature of said molecular sieve means to its desorption temperature and thereby effect desorption of hydrocarbons therefrom.

DETAILED DESCRIPTION OF THE INVENTION

Figure 1:
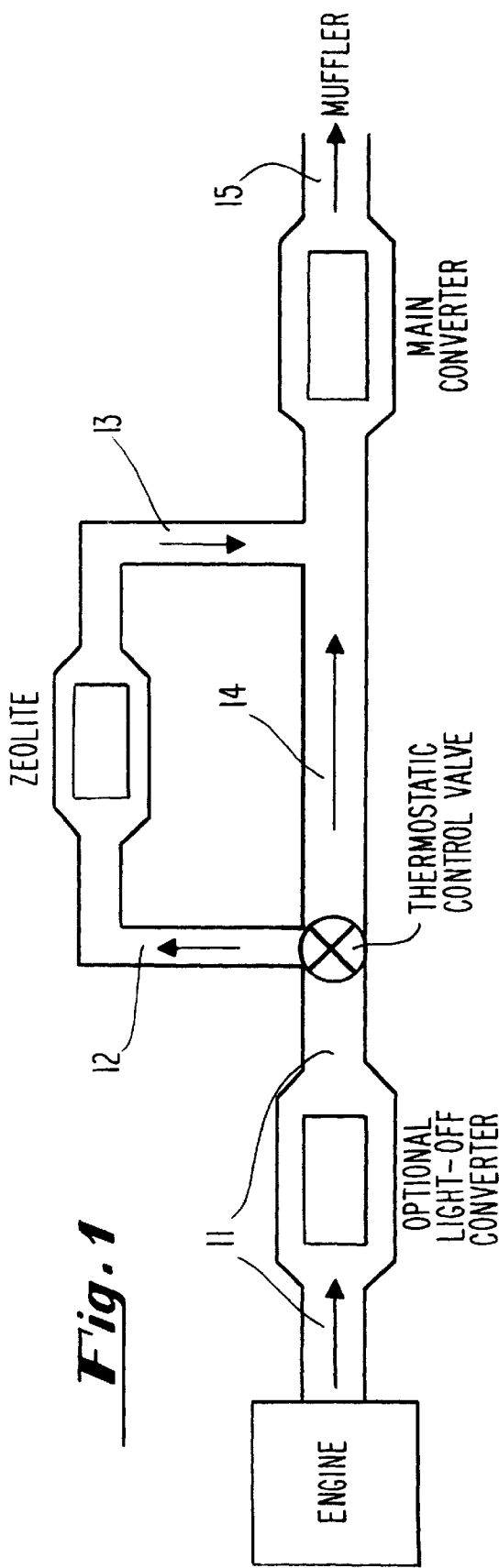
FIGS. 1 and 3 are schematic drawings of engine exhaust systems according to this invention.

The novel engine exhaust system and method of this invention utilize molecular sieve means which are capable of adsorbing and desorbing hydrocarbons selectively. The molecular sieve means have channels in them at the atomic level capable of adsorbing the hydrocarbon molecules. The molecular sieve means utilized in this invention preferably adsorb hydrocarbons preferentially to water.

The preferred molecular sieve means is a high silica zeolite. The crystalline zeolites are hydrated aluminosilicates whose structures are based on a theoretically limitless three-dimensional network of $AlO_x$ and $SiO_y$ tetrahedra linked by the sharing of oxygen atoms. Suitable materials are described, for example, in U.S. Pat. No. 4,297,328, (the disclosure of which is herein incorporated by reference), as those zeolites having a $SiO_2/Al_2O_3$ molar ratio which exceeds about 10 and preferably is in the range of about 70–200. Representative of the high-silica zeolites are "silicalite", ZSM-5, ZSM-8, ZSM-11, ZSM-12, Hyper Y, ultrastabilized Y, Beta, mordenite and erionite. In addition, the high-silica zeolites prepared as described in the illustrative examples of U.S. Pat. No. 4,297,328, are also suitable.

"Silicalite" is a novel crystalline silica composition having a hydrophobic/organophilic characteristic which permits its use for selectively adsorbing organic materials preferentially to water. Silicalite is more completely described in U.S. Pat. No. 4,061,724, the disclosure of which is herein incorporated by reference. ZSM-5, ZSM-8, ZSM-11 and ZSM-12 are crystalline zeolites and are disclosed in U.S. Pat. No. 3,702,886, in British Specification No. 1,334,243, published Oct. 17, 1973, in U.S. Pat. No. 3,709,979, and in U.S. Pat. No. 3,832,449, respectively. The disclosures of each of these patents and publications are herein incorporated by reference.

Ultrastabilized Y is a form of zeolite Y which has been treated to give it the organophilic characteristic of the above-mentioned adsorbents. A description of ultrastabilized Y may be found in "Crystal Structures of Ultrastable Faujasites", Advances in Chemistry Sciences, No. 101. American Chemical Society, Washington, D.C., pages 266–278 (1971).

Novel high-silica zeolite compositions suitable for use in this invention are also described in U.S. Pat. No. 4,257,885, herein incorporated by reference. These zeolites have a chemical composition expressed in terms of moles of oxides as follows:

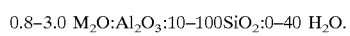

$0.8$–$3.0$ $M_2O$:$Al_2O_3$:$10$–$100SiO_2$:$0$–$40$ $H_2O$.

Other zeolites having the properties described herein may also be used without departing from the scope of this invention.

The preferred molecular sieve means, zeolite, may be utilized in any number of forms. For example, the zeolite may be crystallized directly into powdery or micro-pellet form or pre-formed zeolite may be embedded in or coated on porous ceramic pellets or beads. Such pelletized zeolite, however, provides high resistance to flow, so it is preferred to provide the zeolite in the form of or in combination with a porous substrate, for example, by extruding the zeolite into a porous structure, embedding or coating the zeolite on ceramic substrates, such as extruded honeycombs, or crystallizing the zeolite on the surface of a ceramic substrate.

A method for forming zeolite on the surface of a substrate is disclosed in U.S. Pat. No. 3,730,910, herein incorporated by reference. According to this method, a substrate, consisting of an inorganic oxidic component selected from silicon oxides, aluminum oxides and mixtures thereof, is contacted with a solution selected from silicate solutions or aluminate solutions including a zeolite seed slurry, the solution component being in a concentration ratio to said substrate inorganic oxidic component to form a zeolite. The resulting mixture is heated to yield a zeolite surfaced substrate.

U.S. Pat. No. 4,381,255, herein incorporated by reference, discloses a process for producing binderless zeolite extrudates by extruding a mixture containing equal amounts of a zeolite powder, a metakaolin clay and a near stoichiometric caustic solution. The clay in the extrudate crystallizes to form a coherent particle that is essentially all zeolite.

U.S. Pat. No. 4,631,267, herein incorporated by reference, discloses a method for producing a monolithic support structure for zeolite by (a) mixing into a substantially homogeneous body (i) a zeolite, (ii) a precursor of a permanent binder for the zeolite selected from the group consisting of alumina precursors, silica precursors, titania precursors, zirconia precursors and mixtures of these, the binder precursor having a crystallite size below 200 angstroms, and (iii) a temporary binder; and (b) heating the body to a temperature of from 500 to 1000° C. The mixed body of step (a) may preferably be formed into the shape of a honeycomb. Preferably, the permanent binder precursor is a silicone resin, a suspension of a hydrated alumina, aluminum, chlorohydrate or a suspension of hydrolyzed aluminum isopropoxide, and the temporary binder is methyl cellulose.

A method for preparing a honeycomb of zeolite embedded in a ceramic matrix is disclosed in U.S. Pat. No. 4,657,880, herein incorporated by reference. According to this method, a monolithic support for the zeolite is prepared which has a first substantially continuous sintered phase of ceramic material of high strength, and a second discontinuous phase of the zeolite embedded within the ceramic phase. The zeolite phase is first prepared by mixing a zeolite with a binder, heating the mixture to a temperature up to 250° C. to dry or cure it, and forming the dried or cured mass into coarse particles having a median diameter of 50 to 250 microns. The monolithic support is prepared by mixing 15–50 parts by weight of the particles with 50–85 parts by weight of a ceramic support material, forming this mixture into a honeycomb shape, and heating the shaped mixture to a temperature and for a time sufficient to sinter the ceramic. Preferred binders include silicone resin, polymerized furfuryl alcohol, acrylic resin, methyl cellulose, and polyvinyl alcohol. Preferred ceramic materials include cordierite, mullite, clay, talc, titania, zirconia, zirconia-spinel, alumina, silica, lithium aluminosilicates, and alumina-zirconia composites.

U.S. Pat. No. 4,637,995, herein incorporated by reference, discloses a method for preparing a monolithic zeolite support comprising a ceramic matrix having zeolite dispersed therein. According to this method, a substantially homogeneous body comprising an admixture of (i) a ceramic matrix material, in particulate form finer than 200 mesh, selected from cordierite, mullite, alpha-alumina, lithium aluminosilicate, and mixtures of these, and (ii) a zeolite having a crystallite size no larger than 0.2 microns and a surface area of at least 40 m²/g is prepared. The mixed body is formed into a desired shape, such as a honeycomb, and heated to sinter the ceramic matrix material.

A method for crystallizing strong-bound zeolites on the surfaces of monolithic ceramic substrates is disclosed in U.S. Pat. No. 4,800,187, herein incorporated by reference. According to this method, the ceramic substrate, such as a honeycomb, is treated, in the presence of active silica, with a caustic bath to crystallize the silica to a zeolite form. In one embodiment of the disclosed invention, a monolithic ceramic substrate having an oxide composition consisting essentially of 45–75% by weight silica, 8–45% by weight alumina, and 7–20% by weight magnesia is hydrothermally treated with an aqueous solution comprising sodium oxide or hydroxide, alumina and optionally active silica at a temperature and for a time sufficient to crystallize a desired zeolite on the surfaces of the substrate. In a second embodiment, a monolithic ceramic substrate is coated with a layer of active silica, the coating being 1–45% of the weight of the coated substrate, and then hydrothermally treated with an aqueous solution comprising sodium oxide or hydroxide and alumina to crystallize the active silica to the desired zeolite and provide the zeolite on the surfaces of the substrate. In a third embodiment, a sintered monolithic body, which comprises a porous ceramic material and 1–40% by weight, based on the total body weight, of active silica embedded within the ceramic material, is hydrothermally treated with an aqueous solution comprising sodium oxide or hydroxide and optionally alumina to crystallize a desired zeolite on the surface of the body.

In whatever form the zeolite is incorporated into the molecular sieve means, the means should contain 1–95% by weight zeolite. It is preferred that the converter contain sufficient zeolite or other molecular sieve to adsorb that amount of hydrocarbon that is generally unconverted during start-up of the typical automotive engine system. It will be recognized that because of differences in size and efficiency of various engines, this amount may vary from as low as 3.0 grams in some situations to as much as 9.0–10.0 grams or higher for other engine systems. Generally, it is preferred that the molecular sieve means be capable of adsorbing at least about 6.0 grams of hydrocarbon. The sieves useful in this invention generally can adsorb about 0.03 grams of hydrocarbon per gram of sieve. Accordingly, in the typical engine system, for example, there should be at least about 200 grams of sieve in the molecular sieve means.

In the following description of the engine exhaust system and method of this invention, the molecular sieve means is described in terms of a zeolite. Although the preferred molecular sieve means comprises a zeolite, reference to zeolite in this description is not intended to limit the scope of the invention.

The molecular sieve means utilized in this invention function to adsorb and "hold" a substantial portion of the hydrocarbon emissions generated during start-up of the engine which, because the catalytic converter has not at this period attained its effective operating temperature, would otherwise be discharged to the atmosphere. At ambient temperatures, for example, the zeolites will naturally adsorb several species in addition to hydrocarbons, such as carbon dioxide and the ordinary constituents of air. To the extent the pores are filled with these other species, they are not available to adsorb hydrocarbons. Upon engine start-up, even at cold temperatures, the generated hydrocarbons will begin to be adsorbed to the extent that the zeolite pores are vacant. Further, the mere flow of exhaust stream through the zeolites will dislodge some of the other gaseous species that may have become adsorbed while the engine was idle, allowing hydrocarbons, for which the zeolites show preference, to become adsorbed. As the temperature of the zeolite approaches 70° C. (being heated from contact with the hot exhaust stream), other species start to desorb rapidly and even more substantial adsorption of the hydrocarbons takes place. Desorption of the hydrocarbons from the zeolite commences when the zeolite reaches a temperature of about 250° C., and desorption is generally complete by the time the zeolite reaches a temperature of about 350° C.

The catalysts useful in the main converter of the engine system and in the method of this invention are those which are at least capable of converting hydrocarbons to water and carbon dioxide and are well known in the art. For example, noble metal catalysts, such as mixtures of platinum and palladium, are widely used in automotive catalytic converters. These catalysts are capable not only of oxidizing hydrocarbons but also of converting carbon monoxide in the engine exhaust stream to carbon dioxide. In many cases, three-way converters which additionally convert $NO_x$ to nontoxic by-products, are used. Typically, a three-way converter would comprise both a noble metal catalyst such as platinum and/or palladium, and rhodium. The catalytic converters mentioned herein generally comprise catalysts such as those discussed above and a ceramic support, such as a ceramic honeycomb structure. The catalyst may, for example, be provided on the surface of the support or may be embedded or dispersed within the ceramic support by methods known in the art and discussed above in connection with the zeolite molecular sieve means.

For the purpose of this invention, the "light-off" temperature of the catalytic converter is referred to as the temperature at which there is 50% conversion of hydrocarbons. The catalysts typically utilized in automotive catalytic converters generally have light-off temperatures in the range of about 300 to 400° C. Since hydrocarbons begin to desorb from the zeolite at a temperature below the light-off temperature of the catalyst, it is not possible to merely place the zeolite "in-line" in the exhaust system with the catalyst. A special engine exhaust system design must be utilized which enables the zeolite to "hold" the adsorbed hydrocarbons until the catalyst has activated and then "release" the hydrocarbons to the catalyst for conversion.

As indicated above, it is essential that, as soon after engine start-up as possible, the catalyst then attain its effective temperature, e.g., its light-off temperature. The temperatures of the zeolite and the catalyst are raised by virtue of their contact with the hot exhaust gases emitted by the engine. The engine exhaust system of this invention utilizing a zeolite and a catalytic converter is designed so that these elements are positioned to facilitate their specific functions.

In the engine exhaust system of this invention, for a period of time commencing with engine start-up until a time prior to the zeolite's attaining its desorption temperature, substantially all of the engine exhaust stream is passed through the zeolite. Substantial quantities of hydrocarbon emissions generated during engine start-up, which the converter would not yet be capable of treating, will be adsorbed by the zeolite and held until a later time when the converter has reached an effective operating temperature. As a result of the continuous flow of the hot engine exhaust stream through it, the zeolite would attain its desorption temperature before the converter is activated, and it is therefore necessary to divert the flow of the engine exhaust stream from passing through the zeolite before this occurs. If the exhaust stream were not so diverted, the hydrocarbons from this engine start-up period would be desorbed from the zeolite and passed through to the main converter before it is capable of effectively converting the hydrocarbons, thus negating the intended benefits of the system of the invention.

Once the converter has reached an effective operating temperature, at least a portion of the exhaust stream is once again directed through the zeolite to raise its temperature to its desorption temperature, flush desorbed hydrocarbons from the zeolite and convey them to the converter where they may be oxidized to nontoxic by-products. For the purpose of precision in defining this invention, the minimum point at which the converter is deemed to have reached an effective operating temperature, and thus the point after which at least a portion of the engine exhaust stream can be redirected to the zeolite, is referred to as the point at which the converter has attained its light-off temperature. However, it must be appreciated that this is a somewhat arbitrary cut-off. Even before the converter attains light-off, it has some capability to convert hydrocarbons, and the system or method could be designed so that hydrocarbons are desorbed from the zeolite and conveyed to the converter even before it has attained light-off. Any such method or design would perform substantially the same function in substantially the same way, to achieve substantially the same result as the instantly claimed invention, and is deemed to be equivalent thereto.

The adsorption/desorption of the zeolites has been demonstrated in an engine dynamometer test performed by using a pentasil-type zeolite of the kind useful in the practice of the present invention. As representative of the molecular sieve means used in this invention, such a pentasil-type zeolite was crystallized in situ on the surface of a CELCOR cordierite honeycomb by the method described in U.S. Pat. No. 4,800,187, as discussed above. By passing the exhaust stream of a typical automotive engine through this zeolite-containing honeycomb, and measuring the hydrocarbon content of the stream as it enters and exits the zeolite, it was observed that during engine start-up, the exhaust leaving the engine manifold reached a maximum of approximately 45,000 ppm (about 4.5%) hydrocarbons during the first 20 seconds after start-up, and by 120 seconds after engine start-up, steady-state hydrocarbon emission of approximately 1,500 ppm (about 0.15%)was reached. As the temperature of the zeolite increased due to contact with the exhaust gases, hydrocarbons began to be desorbed from the zeolite, as indicated by a temporary increase in the rate at which hydrocarbon was discharged from the zeolite-containing honeycomb.

Figure 4A:
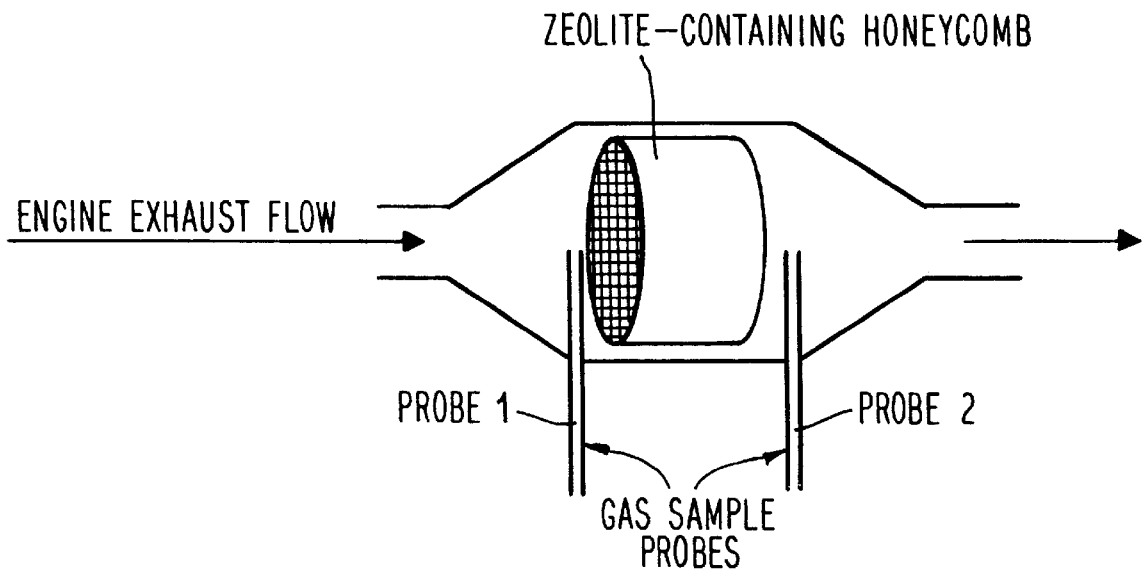
FIG. 4a schematically depicts a test of the zeolite-containing means of the invention.
Figure 4B:
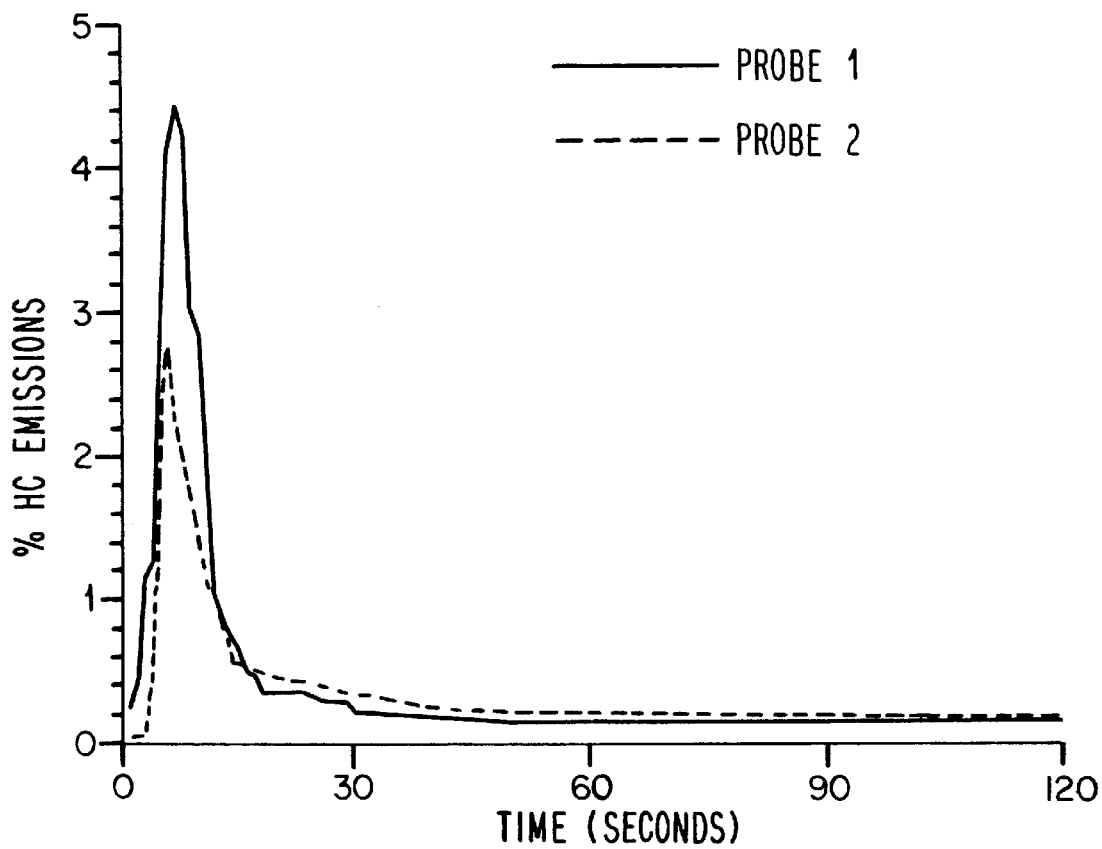
FIG. 4b is a graph, according to the test depicted by FIG. 4a, of the hydrocarbon content of the engine exhaust stream entering and exiting the zeolite-containing means as a function of time after engine start-up.

The procedure and results of this dynamometer test are shown in FIGS. 4a and 4b, respectively. In FIG. 4a, the positioning of the gas probes, through which the hydrocarbon content of the engine exhaust stream was measured, is schematically shown, indicating probe 1 positioned to sample the engine exhaust immediately prior to its contact with the zeolite and probe 2 positioned to sample the exhaust stream as it exits the zeolite-containing honeycomb. FIG. 4b is a plot of the hydrocarbon content of the exhaust stream immediately before it passes through the zeolite-containing honeycomb (as measured by probe 1) and immediately after it exits the honeycomb (as measured by probe 2) as a function of time after engine start-up. As can be seen, during about the first 20 seconds after engine start-up, the hydrocarbon content of the exhaust stream is generally always higher before passing through the zeolites, demonstrating the removal of hydrocarbons from the engine exhaust stream through adsorption by zeolites. After about 20 seconds, however, the temperature of the zeolite is raised to its desorption temperature, and therefore the hydrocarbon content of the stream exiting the zeolite-containing honeycomb is slightly higher than that of the entering stream as the stream desorbs and entrains the previously adsorbed hydrocarbons from the zeolites. By about 120 seconds, the previously adsorbed hydrocarbons are substantially completely desorbed, and therefore the hydrocarbon content of the stream exiting the honeycomb is about the same as that of the entering stream. The data in FIG. 4b also demonstrate the phenomenon, as earlier mentioned, that hydrocarbon emissions from a typical automotive engine are generally at their highest immediately following engine start-up. In the example shown in FIG. 4b, the peak hydrocarbon emissions occurred during the first 20 seconds.

It is also known that some fraction of the adsorbed hydrocarbons generally will be decomposed during the desorption process to carbon itself or will be decomposed and oxidized to carbon monoxide and/or carbon dioxide. Accordingly, the hydrocarbon that is detectable as being flushed from the zeolite during the desorption stage is generally 10–15% less than the hydrocarbon that is originally adsorbed.

One embodiment of an engine exhaust system in accordance with this invention is schematically illustrated in FIG.

Figure 2:
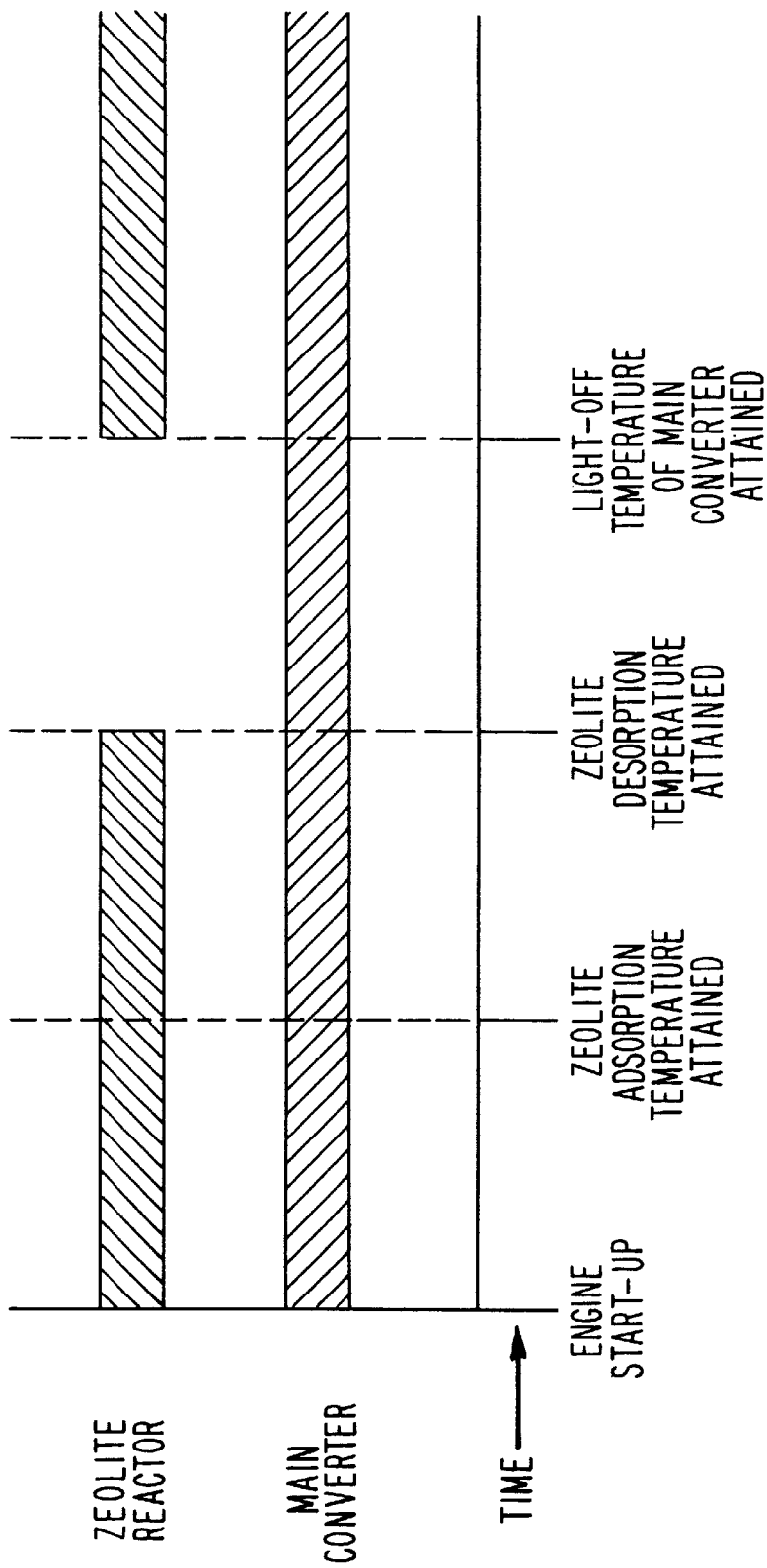
FIG. 2 is a chart illustrating, as a function of time, the direction of exhaust gases through the zeolite reactor and main converter of the engine exhaust system illustrated in FIG. 1.

1. The direction of exhaust gases through the zeolite reactor in the system of FIG. 1 is shown, as a function of time, in FIG. 2. In the embodiment of FIG. 1, an optional light-off converter is positioned closely adjacent to the engine, preferably close enough so that the catalyst can reach activation temperature shortly after engine start-up. As disclosed in U.S. Pat. No. 3,896,616, for example, it is desirable that the light-off converter reach a temperature of at least about 400° F. within about 20 seconds of the beginning of sustained engine combustion. During start-up of the engine, exhaust gases are passed from the engine, generally through an exhaust manifold (not shown), and then through line 11 to the optional light-off converter. The exhaust stream is then directed through the thermostatic control valve and through line 12, bypassing line 14 during this start-up period, to the zeolite where hydrocarbons in the exhaust stream are adsorbed. (As used herein, "line" or "lines" refers to standard exhaust system piping.) Exhaust stream passing through the zeolite, having had hydrocarbon removed therefrom, is then passed through line 13 to the main converter and then through line 15 to the muffler and external atmosphere. Passage of the stream through the main converter begins the process of raising its internal temperature towards its light-off temperature. The hot exhaust gases passing through the zeolite cause its temperature to be raised also, and the thermostatic control valve is programmed so that, prior to the zeolite's attaining its desorption temperature, exhaust gases bypass line 12 and therefore the zeolite and instead pass from the line 11 through the valve and directly to the main converter through line 14. Once the main converter has attained its light-off temperature, as a result of the continued passage of hot gases therethrough, the thermostatic valve operates to direct at least a portion of the exhaust gases through the zeolite in order to raise it to its desorption temperature. This, in turn, causes the release of the hydrocarbons, which then pass with the exhaust gases to the main converter. There, the hydrocarbons that had been held by the zeolite, as well as the hydrocarbon components of the exhaust gases being conveyed directly through line 14, are converted to carbon dioxide and water. The thermostatic control valve can be programmed so that after substantially all hydrocarbons are desorbed from the zeolite, the exhaust gases are diverted in whole or in part from the zeolite; any exhaust gases that so by-pass the zeolite are conveyed only through the converter means and then discharged from the system to the atmosphere.

Figure 3:
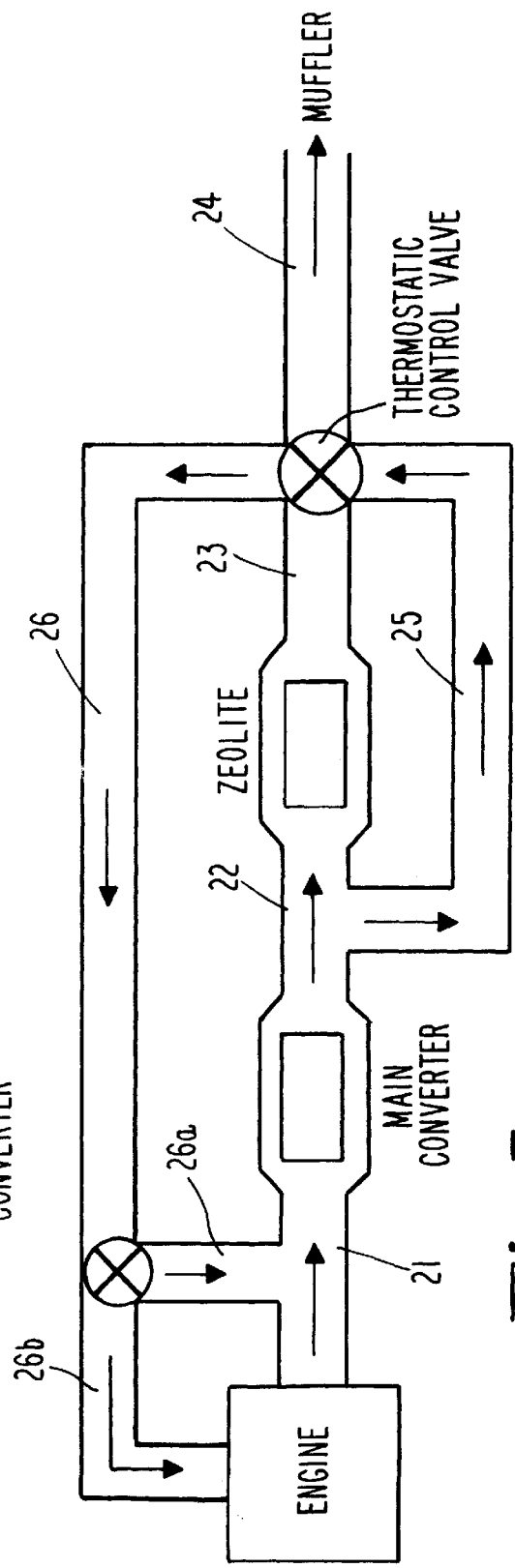

A second embodiment of the engine exhaust system of this invention is illustrated in FIG. 3. In this embodiment, exhaust gases pass from the engine through line 21 to the main converter and out to line 22. During engine start-up, the thermostatic control valve is adjusted so that exhaust gases pass from line 22 through the zeolite and line 23 and then through line 24 to the muffler and external atmosphere. Until the main converter attains effective operating temperature, hydrocarbons in the exhaust gas will simply pass through the converter to the zeolite where they will be adsorbed. As the zeolite approaches its desorption temperature, the valve is operated so that the exhaust gases discharged from the main converter are directed through line 25, bypassing the zeolite, and then through line 24 to the muffler and discharge. The thermostatic control valve is programmed so that after light-off of the main converter is attained, at least a portion of the exhaust gases pass from the main converter through the zeolite, with the remaining portion being directed through line 25 and line 24 to the muffler and discharge. The portion of hot gases that is now directed to pass through the zeolite heats the zeolite to its desorption temperature and flushes out the previously adsorbed hydrocarbons. The gases thus discharged from the zeolite are directed through the valve to line 26 and recycled either to the engine (through line 26b) for further combustion or to the main converter (through line 26a) where the hydrocarbons that had initially been held by the zeolite are converted.

As shown in FIG. 3, the two options for the recycle operation are effected with use of an additional three-way valve in line 26 to convey the recycle stream directly to the engine, through line 26b, or to the intake of the main converter, through line 26a. It will be recognized, however, that exhaust systems of the present invention can be constructed so that the recycle stream is always directed to one or the other, thereby eliminating the need for the valve and one of the branch recycle lines. In either event, if the recycled stream is to be conveyed directly to the main converter, a venturi, pump, or other pressure-raising means will generally be required at some point in line 26 or 26a to generate sufficient pressure. For recycle directly to the engine, no pressure-raising means would be necessary since the engine intake operates at vacuum.

After substantially all hydrocarbons are desorbed from the zeolite, the valve in line 23 can be set so that exhaust gases from the main converter bypass the zeolite, in whole or in part, through line 25 and are discharged from the system through line 24.

Figure 5:
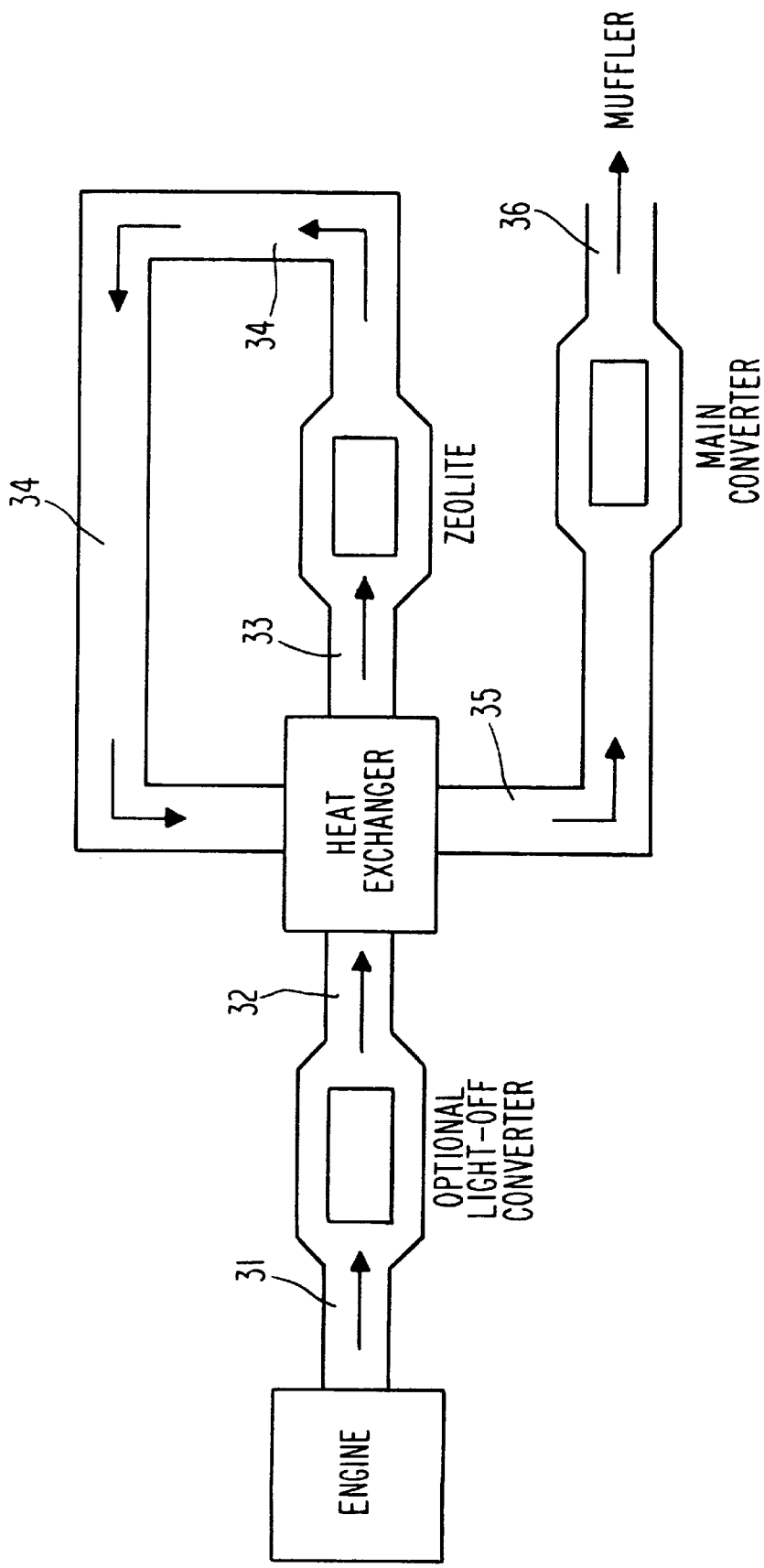
FIG. 5 is a schematic drawing of an engine exhaust system according to this invention employing a heat exchanger.

A further embodiment of the engine exhaust system of the invention is illustrated in FIG. 5. According to this embodiment, a heat exchanger is positioned in the exhaust stream to cool the hot engine exhaust prior to its passage through the zeolite, thereby delaying the time at which the zeolite will reach its desorption temperature, and thereafter to reheat that same stream prior to its conveyance to the main converter so that the catalyst therein is heated at a rate sufficient to quickly raise it to its light-off temperature.

With particular reference to FIG. 5, an optional light-off converter is positioned closely adjacent to the engine. During start-up of the engine, hot exhaust gases are passed from the engine, generally through an exhaust manifold (not shown), and then through line 31 to the optional light-off converter. The exhaust stream is discharged from the light-off converter through line 32 and passes through a heat-exchanger in which it is cooled, as more fully described below, by transfer of heat to incoming line 34. The cooled engine exhaust is discharged from the heat exchanger through line 33 to the zeolite, where hydrocarbons in the exhaust stream are adsorbed. The exhaust stream exits the zeolite via line 34, which will be cooled still further by heat-loss to the environment, and is then directed to the heat exchanger, which it now enters as the "cold side" fluid to absorb heat from hot engine exhaust line 32. The exhaust stream that entered the heat exchanger as line 34 is discharged at a higher temperature through line 35, which directs it to the main converter. Passage of this re-heated stream through the main converter begins the process of raising the converter's internal temperature towards its light-off temperature. From the main converter, the stream is carried through line 36 to the muffler for ultimate discharge from the system to the atmosphere.

The heat exchanger of this embodiment operates most effectively during the initial start-up period of the engine, when the zeolite itself and lines 33 and 34 are initially cool. The heat exchanger is preferably of the counter-current kind in which lines 34 and 32 enter at opposite ends of the exchanger and pass in opposite directions through the unit. With such a design, the initially hot gas stream of line 32 is cooled prior to passage through the zeolite, thereby slowing the rate at which the zeolite is heated and delaying the time at which the zeolite's adsorption capability is ended and desorption commences. Particularly with use of an efficient counter-current heat exchanger, desorption can be delayed until the main converter has reached its light-off temperature. It will be appreciated that as the engine continues to run, the temperature difference between line 32 and line 34 will steadily shrink, resulting in a steady increase in the temperature of the exhaust in line 33, which will accelerate the rate at which the zeolite approaches to its desorption temperature. However, by the time the desorption temperature is reached, the main converter will have attained its light-off temperature. Hydrocarbons desorbed from the zeolite will be carried by the engine exhaust stream through lines 34 and 35 to the main converter, where they will be catalyzed to less noxious gaseous prior to discharge to the atmosphere through line 36.

The heat exchanger (as shown in FIG. 5) can be of the cross-flow type, e.g. constructed of a honeycomb structure as shown in U.S. Pat. No. 3,940,301. However, with suitable and conventional alteration of exhaust piping and connections, the heat exchanger can also be of the rotary type, e.g. constructed of a honeycomb structure as shown in U.S. Pat. No. 4,306,611, or of the stationary, parallel flow type, e.g. constructed of a honeycomb structure as shown in U.S. Pat. Nos. 4,041,591 and 4,041,592. If desired, the heat exchanger can contain a catalyst for conversion, e.g. as shown in U.S. Pat. No. 4,089,088.

What is claimed is:

1. An engine exhaust system for substantially converting hydrocarbons in a hydrocarbon-containing engine exhaust stream to water and carbon dioxide comprising molecular sieve means for adsorbing hydrocarbons from said engine exhaust stream, said means being capable of adsorbing hydrocarbons from said stream and further capable of having hydrocarbons desorbed therefrom upon heating to a desorption temperature;

main catalytic converter means for substantially converting hydrocarbons in said stream to water and carbon dioxide, said main catalytic converter means having a light-off temperature;

one or more conveying means for selectively conveying said engine exhaust stream within said engine exhaust system, whereby said conveying means operate to
   (i) convey, for a first period of time prior to said molecular sieve means attaining its desorption temperature, substantially all of said exhaust stream through said molecular sieve means and said converter means;
   (ii) convey, for a second period of time thereafter, substantially all of said exhaust stream through said catalytic converter means, bypassing said molecular sieve means; and
   (iii) convey, for a third period of time thereafter, after said catalytic converter means attains at least its light-off temperature, at least a portion of said exhaust stream through said molecular sieve means and thereafter through said main catalytic converter means, said conveyed portion of exhaust stream being sufficient to raise the temperature of said molecular sieve means to its desorption temperature and thereby effect desorption of hydrocarbons therefrom.

2. The engine exhaust system of claim 1 wherein said molecular sieve means comprises zeolite.

3. The engine exhaust system of claim 1 wherein said zeolite is a high silica zeolite.

4. The engine exhaust system of claim 3 wherein said high silica zeolite is selected from the group consisting of silicalite, ZSM-5, ZSM-8, ZSM-11, ZSM-12, Hyper Y, ultrastabilized Y, Beta, mordenite, and erionite.

5. The engine exhaust system of claim 1 wherein said molecular sieve means comprises a ceramic substrate coated or embedded with zeolite.

6. The engine exhaust system of claim 1 wherein said molecular sieve means comprises a zeolite crystallized on the surface of a ceramic substrate.

7. The engine exhaust system of claim 5 wherein said ceramic substrate comprises a honeycomb structure.

8. The engine exhaust system of claim 6 wherein said ceramic substrate comprises a honeycomb structure.

9. The engine exhaust system of claim 1 wherein said main catalytic converter means additionally converts carbon monoxide and $NO_x$ to non-toxic by-products.

10. The engine exhaust system of claim 1 wherein said conveying means comprise a thermostatically controlled valve.

11. The engine exhaust system of claim 1 wherein said one or more conveying means operate, for said third period of time, to convey through said molecular sieve means a portion of said exhaust stream sufficient to effect desorption of substantially all hydrocarbons from said molecular sieve means and to convey said desorbed hydrocarbons to said main catalytic converter means.

12. The engine exhaust system of claim 11 wherein, for a fourth period of time subsequent to the desorption of substantially all hydrocarbons from said molecular sieve, said one or more conveying means operate to convey substantially all of said exhaust to said converter means, bypassing said molecular sieve means.

13. A method of controlling hydrocarbon emissions from an internal combustion engine producing a hydrocarbon-containing exhaust stream comprising providing main catalytic converter means for substantially converting hydrocarbons in said hydrocarbon-containing exhaust stream to water and carbon dioxide, said main catalytic converter means having a light-off temperature;

providing molecular sieve means for adsorbing hydrocarbons from said exhaust stream, said means being capable of adsorbing hydrocarbons from said stream and further capable of having hydrocarbons desorbed therefrom upon heating to a desorption temperature;

selectively directing said exhaust stream so as to
   (i) direct, for a first period of time prior to said molecular sieve means attaining its desorption temperature, substantially all of said exhaust stream through said molecular sieve means and said converter means;
   (ii) direct, for a second period of time thereafter, substantially all of said exhaust stream through said catalytic converter means, bypassing said molecular sieve means; and
   (iii) direct, for a third period of time thereafter, after said catalytic converter means attains at least its light-off temperature, at least a portion of said exhaust stream through said molecular sieve means and thereafter through said main catalytic converter means, said directed portion of exhaust stream being sufficient to raise the temperature of said molecular sieve means to its desorption temperature and thereby effect desorption of hydrocarbons therefrom.

14. The method of claim 13 wherein said molecular sieve means comprises zeolite.

15. The method of claim 13 wherein said zeolite is a high silica zeolite.

16. The method of claim 15 wherein said high silica zeolite is selected from the group consisting of silicalite, ZSM-5, ZSM-8, ZSM-11, ZSM-12, Hyper Y, ultrastabilized Y, Beta, mordenite, and erionite.

17. The method of claim 13 wherein said molecular sieve means comprises a ceramic substrate coated or embedded with zeolite.

18. The method of claim 13 wherein said molecular sieve means comprises a zeolite crystallized on the surface of a ceramic substrate.

19. The method of claim 17 wherein said ceramic substrate comprises a honeycomb structure.

20. The method of claim 18 wherein said ceramic substrate comprises a honeycomb structure.

21. The method of claim 13 wherein said main catalytic converter means additionally converts carbon monoxide and $NO_x$ to non-toxic by-products.

22. The method of claim 13 wherein, during said third period of time, said portion of said exhaust stream directed through said molecular sieve means is sufficient to effect desorption of substantially all hydrocarbons from said molecular sieve means and to convey said desorbed hydrocarbons to said main catalytic converter means.

23. The method of claim 22 comprising the additional step of conveying, for a fourth period of time subsequent to the desorption of substantially all hydrocarbons from said molecular sieve, substantially all of said exhaust stream to said converter means, bypassing said molecular sieve means.

24. A process for treating an engine exhaust gas stream containing hydrocarbons and other pollutants comprising directing the engine exhaust gas stream over an adsorbent zone comprising a molecular sieve bed which preferentially adsorbs the hydrocarbons over water, to provide a first exhaust stream, flowing the first exhaust gas stream and discharging the treated exhaust stream into the atmosphere, said process being carried out for a time until the molecular sieve bed temperature is about 150° C., at which time the engine exhaust gas stream is diverted completely away from the adsorbent zone and routed directly over the primary catalyst until such time as the primary catalyst reaches its operating temperature, at which time the engine exhaust gas stream is divided into a major and minor portion, flowing the major portion of the engine exhaust gas stream over the primary catalyst and then discharging the treated exhaust gas stream from the primary catalyst into the atmosphere, flowing the minor portion of the engine exhaust gas stream over the adsorbent zone for a time sufficient to desorb substantially all the hydrocarbons absorbed on the molecular sieve bed and provide a second exhaust gas stream containing desorbed hydrocarbons, flowing the second exhaust stream and discharging the treated exhaust stream to the atmosphere and after such time as necessary to desorb substantially all the hydrocarbons from the molecular sieve bed, the engine exhaust gas stream is completely directed over the primary catalyst to provide a treated exhaust gas stream to the atmosphere; the molecular sieve being selected from the group consisting of silicalite, mordenites, zeolite ultrastable Y, and ZSM-5.

* * * * *